US010208368B2

(12) United States Patent
Imanaka et al.

(10) Patent No.: US 10,208,368 B2
(45) Date of Patent: Feb. 19, 2019

(54) COLD-ROLLED STEEL PLATE AND METHOD OF MANUFACTURING THE SAME

(71) Applicant: Nisshin Steel Co., Ltd., Tokyo (JP)

(72) Inventors: Tomohiro Imanaka, Kure (JP); Kouji Omosako, Kure (JP); Masahito Suzuki, Kure (JP)

(73) Assignee: NISSHIN STEEL CO., LTD, Tokyo (JP)

( * ) Notice: Subject to any disclaimer, the term of this patent is extended or adjusted under 35 U.S.C. 154(b) by 368 days.

(21) Appl. No.: 14/763,199

(22) PCT Filed: Nov. 5, 2013

(86) PCT No.: PCT/JP2013/079834
§ 371 (c)(1),
(2) Date: Jul. 24, 2015

(87) PCT Pub. No.: WO2014/119078
PCT Pub. Date: Aug. 7, 2014

(65) Prior Publication Data
US 2015/0361530 A1 Dec. 17, 2015

(30) Foreign Application Priority Data

Jan. 31, 2013 (JP) .................................. 2013-016754

(51) Int. Cl.
*C22C 38/28* (2006.01)
*C21D 9/46* (2006.01)
*C22C 38/00* (2006.01)
*C22C 38/14* (2006.01)
*C22C 38/54* (2006.01)
*C22C 38/02* (2006.01)
*C22C 38/04* (2006.01)
*C22C 38/06* (2006.01)
*C22C 38/12* (2006.01)
*C21D 8/02* (2006.01)
*B21B 1/22* (2006.01)
*B21B 45/00* (2006.01)
*C21D 6/00* (2006.01)
*C22C 38/08* (2006.01)
*C22C 38/26* (2006.01)

(52) U.S. Cl.
CPC ................ *C22C 38/28* (2013.01); *B21B 1/22* (2013.01); *B21B 45/004* (2013.01); *C21D 6/001* (2013.01); *C21D 6/002* (2013.01); *C21D 6/005* (2013.01); *C21D 6/008* (2013.01); *C21D 8/0226* (2013.01); *C21D 8/0236* (2013.01); *C21D 8/0263* (2013.01); *C21D 9/46* (2013.01); *C22C 38/00* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/26* (2013.01); *C22C 38/54* (2013.01); *C21D 2201/03* (2013.01); *C21D 2211/004* (2013.01); *C21D 2211/005* (2013.01); *C21D 2211/008* (2013.01); *Y02P 10/212* (2015.11)

(58) Field of Classification Search
CPC ......... C22C 38/28; C22C 38/26; C22C 38/14; C22C 38/12; C22C 38/06
See application file for complete search history.

(56) References Cited

U.S. PATENT DOCUMENTS

| 7,749,338 B2 | 7/2010 | Yokoi et al. |
| 2001/0001049 A1 | 5/2001 | Higo et al. |
| 2003/0106622 A1 | 6/2003 | Matsuoka et al. |
| 2005/0106411 A1* | 5/2005 | Ishikawa et al. ............. 428/683 |
| 2006/0081312 A1 | 4/2006 | Yokoi et al. |

FOREIGN PATENT DOCUMENTS

| CN | 1732279 A | 2/2006 | |
| EP | 0475096 A1 | 3/1992 | |
| EP | 1143022 A1 | 10/2001 | |
| EP | 1577412 A1 | 9/2005 | |
| JP | 2001073073 A | 3/2001 | |
| JP | 2001355040 A | * 12/2001 | ............. C22C 38/00 |
| JP | 2002363693 A | 12/2002 | |
| JP | 2003277883 A | 10/2003 | |
| JP | 2004162153 A | 6/2004 | |
| JP | 2005249050 A | 9/2005 | |
| JP | 2005249051 A | 9/2005 | |
| JP | 2005249106 A | 9/2005 | |
| JP | 2007138261 A | 6/2007 | |
| JP | 2007211260 A | 8/2007 | |
| JP | 2008266731 A | 11/2008 | |

(Continued)

OTHER PUBLICATIONS

Chinese Office Action dated Mar. 29, 2016, issued in corresponding Chinese Application No. 201380071636.9.

(Continued)

*Primary Examiner* — Edward M Johnson
(74) *Attorney, Agent, or Firm* — Troutman Sanders LLP (57) ABSTRACT

A cold-rolled steel plate having favorable heat spot resistance and favorable antiwear performance is provided.
The cold-rolled steel plate has a chemical composition containing C from 0.03 to 0.12%, Si from 0 to 1.0% (including a case where Si is not added), Mn from 0.2 to 0.8%, P at 0.03% or less (excluding a case where P is not added), S at 0.03% or less (excluding a case where S is not added), Ti from 0.04 to 0.3%, and Al at 0.05% or less (excluding a case where Al is not added). A residue is formed of Fe and unavoidable impurities. Each element satisfies a relationship of 5*C %–Si %+Mn %–1.5*Al %<1 within the aforementioned range of the corresponding content. An average diameter of particles of a Ti-based carbide is from 20 to 100 nm. In this way, the Ti-based carbide is dispersed finely and uniformly, thereby enhancing heat spot resistance and antiwear performance.

6 Claims, 1 Drawing Sheet

(56) References Cited

FOREIGN PATENT DOCUMENTS

| | | |
|---|---|---|
| JP | 2010132983 A | 6/2010 |
| JP | 2011001604 A | 1/2011 |
| JP | 2012180547 A | 9/2012 |

OTHER PUBLICATIONS

European Extended Search Report dated Jul. 28, 2016, issued in the corresponding European Patent Application No. 13873956.0.
Office Communication dated Jul. 17, 2017, issued in the corresponding European Patent Application No. 13873956.0.
Office Action dated Jul. 21, 2016 during the prosecution of corresponding Korean Patent Application 519980849689.
Office Action dated Sep. 14, 2017 during the prosecution of corresponding U.S. Appl. No. 15/624,981.

* cited by examiner

COLD-ROLLED STEEL PLATE AND METHOD OF MANUFACTURING THE SAME

CROSS REFERENCE TO RELATED APPLICATIONS

The present application is the U.S. National Phase of International Patent Application Serial No. PCT/JP2013/079834, filed on Nov. 5, 2013, which claims priority to Japanese Patent Application Serial No. 2013-016754, filed Jan. 31, 2013, both of which are incorporated by reference in their entireties.

TECHNICAL FIELD

This invention relates to a cold-rolled steel plate used for example as a clutch plate, and a method of manufacturing the same.

BACKGROUND ART

A multiplate wet clutch for an automatic transmission has an alternate arrangement of multiple friction plates each with a friction material formed of a special sheet of paper attached to a surface thereof and separator plates to contact the friction plates. Action of making a switch between separating and connecting the friction plates and the separator plates controls transmission of power.

The friction plate and the separator plate are both ring-shaped steel plate members. Generally, such a friction plate and a separator plate forming the multiplate wet clutch are collectively called a clutch plate.

The following four phenomena are known as major defect phenomena occurring in the separator plate: wear of a spline part (hereinafter called feature A); a rattle due to an inaccurate position of the spline part (hereinafter called feature B); change in roughness due to wear of a surface in friction with the friction plate (hereinafter called feature C); and the occurrence of a heat spot and nonuniformity of a shape and a material quality due to the heat spot (hereinafter called feature D). All of these phenomena are significant characteristics, among which a defect due to heat spots is the hardest to deal with.

In response to behavior of the multiplate wet clutch to make a shift from a neutral state to a power transmission state to engage the clutch, the friction plate and the separator plate are pressed against each other under high load and a high relative velocity. This rapidly reduces the relative velocity between the friction plate and the separator plate. Resultant frictional heat rapidly enters a surface of the separator plate to become a sliding portion, thereby increasing the temperature of the surface of the separator plate. This temperature increase in the surface of the separator plate becomes a cause for the occurrence of a heat spot.

A projection at the heat spot area resulting from heating with the frictional heat, distortion occurring around the heat spot, and local change in a material quality cause a nonuniform frictional state when the clutch is actuated. The non-uniform frictional state causes a new heat spot. Such a vicious cycle degrades the performance of the multiplate wet clutch to a large extent.

Enhancing fuel efficiency of automobiles is an extremely important problem to be solved at the present time. Enhancing efficiency in terms of a mechanistic aspect and reducing the size and weight of the clutch as a unit are very important elements among various elements forming an automobile.

Requirements for a transmission include enhancement of efficiency, reduction in friction loss, and reduction in size and weight. The efficiency of the multiplate wet clutch should be enhanced to satisfy these requirements. The efficiency of the multiplate wet clutch may be enhanced for example by reduction in the diameter of a plate, reduction in the number of plates, and increase in a coefficient of friction achieved by reducing a lubricant and changing a friction material. However, all of these become causes for excessive temperature increase, specifically, a heat spot that cannot be handled with a conventional technique.

Enhancing the performance of the clutch plate in terms of its material may lead to dramatic enhancement of the efficiency of the transmission. Thus, enhancing heat spot resistance is required for a steel plate to be used as the clutch plate.

Methods described for example in PTLs 1 to 5 are known as techniques relating to enhancement of the heat spot resistance of a steel plate.

According to the method described in PTL 1, temperature of phase transformation from ferrite to austenite is increased using low-carbon steel. This prevents the occurrence of phase transformation even if a plate is heated by frictional heat during engagement of a clutch, thereby suppressing the occurrence of a heat spot.

According to the method described in PTL 2, the thermal diffusivity of a steel plate is increased by defining an alloy element content. This suppresses temperature increase of a plate to be caused by frictional heat to suppress the occurrence of a heat spot.

According to the method described in PTL 3, austenitic stainless steel unlikely to be phase transformed is used as a material for a plate, thereby suppressing the occurrence of a heat spot.

According to the method described in PTL 4, a Ti precipitate or an Nb precipitate is used to suppress the occurrence of a heat spot.

According to the method described in PTL 5, in addition to using a Ti precipitate or an Nb precipitate. Si or Al having the effect of increasing a transformation point is added to suppress the occurrence of a heat spot.

In addition to enhancement of efficiency, reduction in friction loss, and reduction in size and weight of a transmission achieved by enhancing heat spot resistance, the antiwear performance of a spline part such as a tooth tip of the separator plate is also one important characteristic.

Methods described in PTLs 6 to 9 are known as techniques relating to enhancement of the antiwear performance of a tooth tip of the separator plate.

According to the method described in PTL 6, antiwear performance is enhanced by using a hard precipitate such as TiC or cementite.

According to the method described in PTL 7, a hot-rolled steel plate having a ferrite structure with ferrite particles with a diameter of 5 μm or more and 15 μm or less is cold rolled at rolling reduction of 50% or more, thereby enhancing antiwear performance.

According to the method described in PTL 8, a steel structure is controlled through combined addition of Cr, Ti, and B, thereby enhancing antiwear performance.

According to the method described in PTL 9, a steel structure is controlled by controlling a fraction of pearlite and that of cementite and controlling the diameter of ferrite particles, thereby enhancing antiwear performance.

CITATION LIST

Patent Literature

PTL 1: Japanese Laid-open Patent Publication No. 2005-249050
PTL 2: Japanese Laid-open Patent Publication No. 2005-249051
PTL 3: Japanese Laid-open Patent Publication No. 2005-249106
PTL 4: Japanese Laid-open Patent Publication No. 2008-266731
PTL 5: Japanese Laid-open Patent Publication No. 2010-132983
PTL 6: Japanese Laid-open Patent Publication No. 2001-73073
PTL 7: Japanese Laid-open Patent Publication No. 2003-277883
PTL 8: Japanese Laid-open Patent Publication No. 2007-211260
PTL 9: Japanese Laid-open Patent Publication No. 2004-162153

SUMMARY OF INVENTION

Technical Problem

However, the aforementioned methods of PTLs 1 to 5 are only responsive to some of the aforementioned four features A to D required to be handled regarding the separator plate. Further, the aforementioned methods of PTLs 1 to 5 have many problems to be solved including failing to achieve sufficient effect in terms of heat spot resistance, reduction in manufacturing performance, and increase in material cost.

As an example, PTLs 1, 2, and 3 do not consider how to handle the features A, B, and C, failing to achieve sufficient result in terms of enhancement of efficiency, reduction in friction loss, and reduction in size and weight of a transmission.

Regarding the austenitic stainless steel described in PTL 3, not only is it much more expensive than a steel plate generally used as a clutch plate, but stainless steel also has low heat conductivity which may cause a problem of increasing the temperature of a steel plate surface easily due to low diffusion performance of frictional heat.

The steel compositions described in PTLs 4 and 5 were actually examined and found to be able to enhance heat spot resistance. However, they fail to achieve sufficient results in terms of enhancement of efficiency, reduction in friction loss, and reduction in size and weight of a transmission.

PTL 5 describes addition of Si and Al. However, adding Si and Al causes many problems in terms of manufacturing and is not effective from an industrial viewpoint as it is likely to cause brittle fracture of a slab or a coil.

PTLs 6 to 9 are to merely enhance antiwear performance. Specifically, the separator plate is required not only to achieve high antiwear performance at a spline part but also to avoid damage to a counterpart drum or a counterpart case. Thus, simply being capable of enhancing antiwear performance is not sufficient for a material for the separator plate.

Controlling change in roughness of a surface in friction with the friction plate is also a different significant characteristic relating to wear or a wear phenomenon. Specifically, the performance of a surface of the separator plate against wear caused by a friction sheet of paper as a counterpart material is an important issue. Damage to the friction sheet of paper as a counterpart material of friction should certainly be avoided.

None of PTLs 6 to 9 gives consideration to providing both of two types of antiwear performances of different features at two sites, a spline part and a surface.

Thus, a steel plate achieving favorable heat spot resistance and favorable antiwear performance has been required as a material for a clutch plate, for example.

This invention has been made in view of the aforementioned issues. It is an object of this invention to provide a cold-rolled steel plate with favorable heat spot resistance and favorable antiwear performance and a method of manufacturing the cold-rolled steel plate.

Solution to Problem

A cold-rolled steel plate as recited in claim 1 has a chemical composition containing, on the basis of percent by mass, C from 0.03 to 0.12%, Si from 0 to 1.0%, Mn from 0.2 to 0.8%, P at 0.03% or less, S at 0.03% or less, Ti from 0.04 to 0.3%, and Al at 0.05% or less, with a residue being formed of Fe and unavoidable impurities. The chemical composition satisfies $5*C \% - Si \% + Mn \% - 1.5*Al \% < 1$. An average diameter of particles of a Ti-based carbide as precipitates is from 20 to 100 nm. The cold-rolled steel plate has cross-sectional hardness from 200 to 400 HV.

According to a cold-rolled steel plate as recited in claim 2, in the cold-rolled steel plate according to claim 1, the chemical composition contains, on the basis of percent by mass, at least one of Cr from 0.10 to 2.0%, Ni from 0.05 to 0.5%, Mo from 0.05 to 0.5%, B from 0.0002 to 0.002%, Nb from 0.01 to 0.2%, and V from 0.01 to 0.2%. The chemical composition satisfies $5*C \% - Si \% + Mn \% + 1.6*Cr \% + 0.8*Ni \% - 1.5*Al \% < 1$.

According to a cold-rolled steel plate as recited in claim 3, in the cold-rolled steel plate according to claim 1, the average diameter of particles of the Ti-based carbide is from 20 to 100 nm in a front layer part extending at least 200 μm from a surface of the steel plate.

According to a method of manufacturing a cold-rolled steel plate as recited in claim 4, a steel slab having the chemical composition as recited in claim 1 is smelted, the steel slab is heated to 1200° C. or more and hot rolled to form a hot-rolled steel plate, the hot-rolled steel plate is wound from 500 to 700° C. to form a hot-rolled coil, and the hot-rolled coil is cold rolled or the hot-rolled coil is annealed and cold-rolled, thereby obtaining cross-sectional hardness from 200 to 400 HV.

According to a cold-rolled steel plate as recited in claim 5, in the cold-rolled steel plate according to claim 2, the average diameter of particles of the Ti-based carbide is from 20 to 100 nm in a front layer part extending at least 200 μm from a surface of the steel plate.

According to a method of manufacturing a cold-rolled steel plate as recited in claim 6, a steel slab having the chemical composition as recited in claim 2 is smelted, the steel slab is heated to 1200° C. or more and hot rolled to form a hot-rolled steel plate, the hot-rolled steel plate is wound from 500 to 700° C. to form a hot-rolled coil, and the hot-rolled coil is cold rolled or the hot-rolled coil is annealed and cold-rolled, thereby obtaining cross-sectional hardness from 200 to 400 HV.

Advantageous Effects of Invention

According to this invention, the chemical composition is controlled and the average diameter of particles of the Ti-based carbide is from 20 to 100 nm. This enhances heat spot resistance and antiwear performance.

DESCRIPTION OF EMBODIMENTS

An embodiment of this invention will be described.

A cold-rolled steel plate of this invention is used, for example, as a material for a clutch plate in a multiplate wet clutch mechanism of an automatic transmission of an automobile.

A cause for the occurrence of a heat spot in a clutch plate formed of a normal steel plate is described first.

If a clutch is engaged under high load, temperature increases considerably by friction in a surface of the clutch plate in the engaged state. This austenitizes a metal structure of the steel plate. In the steel plate, a region where austenitization occurs in response to temperature increase during engagement of the clutch is limited to a front layer of the steel plate. Temperature increase to a degree that causes phase transformation does not occur inside the steel plate.

The heated region in the surface of the steel plate is rapidly cooled (self-cooled) resulting from rapid heat conduction to the inside of the steel plate in a low temperature to be martensitically transformed.

If the part heated by friction is rapidly cooled by self-cooling to be martensitically transformed, a resultant martensitic structure expands in volume to form a heat spot that is a region like a projection projecting to a higher position than its surrounding.

The volume expansion occurring during the martensitic transformation applies compressive residual stress to a surrounding structure. This damages the flatness of the clutch plate to distort the clutch plate.

Such a heat spot is suppressed effectively by the following first to fourth countermeasures.

The first countermeasure is to suppress temperature increase of the clutch plate caused by frictional heat. More specifically, the heat conductivity of the steel plate forming the clutch plate is increased. This rapidly diffuses heat from a friction part in the surface of the clutch plate to a surrounding, thereby suppressing abnormal temperature increase from occurring locally in the outermost surface.

The heat conductivity of steel becomes highest in pure iron and becomes lower with increase in an alloy element added content. The heat conductivity also becomes lower with increase in the area of the second phase such as pearlite. Meanwhile, adding an alloy element into steel is necessary for ensuring appropriate strength and antiwear performance of the steel plate as a clutch plate.

Strength and antiwear performance required for the steel plate as a clutch plate are ensured and high heat conductivity is maintained effectively by forming a dispersed metal structure with fine precipitates dispersed uniformly in a ferrite structure.

The second countermeasure is to suppress transformation into the γ phase of a metal structure in a front layer part of the clutch plate even if the temperature of the clutch plate is increased by frictional heat. More specifically, even if temperature increase of the surface of the steel plate by the frictional heat is unavoidable, austenitization to occur resulting from temperature increase by friction is still suppressed by making austenite transformation of the steel plate itself unlikely.

Austenite transformation is suppressed effectively by increasing a transformation point or delaying dissolving of a carbide.

A transformation point is increased effectively by adding an element to increase a point of α to γ transformation (transformation point A1) or reducing the added content of an element to reduce the transformation point A1.

Dissolving is delayed effectively by making a carbide exist in steel with stable properties that prevent dissolving of the carbide as much as possible.

In carbon steel, α to γ transformation starts with dissolving of a carbide at an interface between the carbide and the mother phase. If the carbide is dissolved in the α phase or the γ phase easily, the α to γ transformation proceeds promptly. Meanwhile, if the carbide is not dissolved easily, progress of the α to γ transformation is suppressed.

The transformation point drops with C, Mn, and Ni, and increases with Si and Cr. Thus, it is important to minimize the respective added contents of C, Mn, and Ni as much as possible. Where needed, the respective added contents of Si and Cr may be increased in consideration of other conditions, for example.

An $Fe_3C$ (cementite: θ)-based material as a carbide has the property of being dissolved easily. Meanwhile, in the case of steel containing Cr, Cr tends to be concentrated in $Fe_3C$. The concentration of Cr stabilizes $Fe_3C$. Compared to $Fe_3C$, a Ti-based carbide or an Nb-based carbide has the property of being remarkably stable and having a low degree of solubility in the γ phase.

Specifically, dispersing a Ti-based carbide or an Nb-based carbide finely and uniformly is a considerably excellent method of ensuring the strength and antiwear performance of the steel plate. Thus, using a Ti-based carbide or an Nb-based carbide is a preferable method of suppressing transformation into the γ phase. Adding Ti or Nb is also an effective method of reducing C as an element to reduce a transformation point most prominently.

As described above, strength and antiwear performance are ensured effectively by adding Ti or Nb and forming a hard carbide. With the intention of reducing the amount of redundant C not to be bonded to Ti or Nb, an optimum added content is determined in consideration of a relationship of a Ti added content or an Nb added content with the amount of C. This reduces the amount of dissolved C in a part heated by friction, thereby suppressing transformation into the γ phase further.

The third countermeasure is to suppress martensitic transformation that is caused by self-cooling of the clutch plate even if temperature increase by frictional heat transforms a metal structure in a front layer pan of the clutch plate into the γ phase. More specifically, even if temperature increase and transformation into the γ phase of the surface of the steel plate are unavoidable, martensitic transformation that is caused by self-cooling is still suppressed by reducing the quenching performance of the steel plate.

The quenching performance is reduced effectively by reducing the added content of an element to enhance the quenching performance and by making the diameter of γ crystal grains finer.

To reduce the added content of an element to enhance the quenching performance, Si, Mn, Ni, Cr, Mo, B, and the like are added. More specifically, many alloy elements have the effect of enhancing the quenching performance. Thus, it is important to add Si, Mn, Ni, Cr, Mo, B, and the like while reducing the content of other element to the smallest possible amount.

The diameter of γ crystal grains is made finer effectively through use of a grain boundary pinning effect achieved by a fine precipitate. More specifically, a Ti-based carbide, an Nb-based carbide, and a nitride are dispersed finely to make the diameter of γ grains finer. This facilitates nucleation in the α phase during cooling from the γ phase, thereby reducing the quenching performance. Such use of Ti and Nb is considerably effective as it not only acts to enhance heat conductivity and suppress transformation into the γ phase, but also acts to enhance strength and antiwear performance.

The fourth countermeasure is to suppress deformation of the clutch plate due to transformation stress even if temperature increase by frictional heat transforms a metal structure in the front layer part of the clutch plate into the γ phase to martensitically transform the metal structure as a result of self-cooling. More specifically, even if martensitic transformation (conversion to a heat spot) of a heated part in the surface of the steel plate is unavoidable, distortion of the clutch plate due to the heat spot is suppressed by ensuring sufficient strength of a metal structure surrounding the heat spot.

As described above, the heat spot itself is considered to be a martensitic region formed from heating and rapid cooling of a friction part. Though not as high as in the heat spot, temperature increases in a surrounding of the heat spot resulting from frictional heat to affect the metal structure. The heat spot is subjected to phase transformation from α to γ and then to martensite. However, the surrounding of the heat spot is not heated to a degree that causes transformation into the γ phase, so that it becomes soft in many cases resulting from its material structure. More specifically, a steel plate generally used as a clutch plate has work hardness controlled to be from about 250 to about 320 HV through hardening by cold rolling. In the surrounding of the heat spot, the cold rolling causes recovery and recrystallization of a worked structure with heat resulting from frictional heat, thereby reducing hardness.

Thus, softening of the surrounding of the heat spot can be suppressed by suppressing recovery and recrystallization of a cold-rolled structure. More specifically, by adding Ti or Nb and forming a structure containing a highly thermally stable Ti-based carbide or an Nb-based carbide dispersed uniformly in the structure, recrystallization can be suppressed and reduction in hardness can be suppressed effectively.

Based on the aforementioned first, second, third, and fourth countermeasures, the chemical composition of a cold-rolled steel plate is defined as follows. Unless otherwise stated, the content of each element is expressed on the basis of percent by mass.

The cold-rolled steel plate contains C from 0.03 to 0.12%, Si from 0 to 1.0% (including a case where Si is not added), Mn from 0.2 to 0.8%, P at 0.03% or less (excluding a case where P is not added), S at 0.03% or less (excluding a case where S is not added), Ti from 0.04 to 0.3%, and Al at 0.05% or less (excluding a case where Al is not added), with a residue being formed of Fe and unavoidable impurities.

Each element is added within the aforementioned range of the corresponding content so as to satisfy a formula (1): $5*C\%-Si\%+Mn\%-1.5*Al\%<1$. In the formula (1), C % means the content of C (%). Si % means the content of Si (%), Mn % means the content of Mn (%), and Al % means the content of Al (%).

If the occasion arises, at least one of Cr from 0.10 to 2.0%, Ni from 0.05 to 0.5%, Mo from 0.05 to 0.5%, B from 0.0002 to 0.002%, Nb from 0.01 to 0.2%, and V from 0.01 to 0.2% is added.

If these elements are to be added according to demand, each element is added within the aforementioned range of the corresponding content so as to satisfy a formula (2): $5*C\%-Si\%+Mn\%+1.6*Cr\%+0.8*Ni\%-1.5*Al\%<1$.

Each element and the content of each element in the cold-rolled steel plate are described below.

Regarding C (carbon), a content below 0.03% makes it difficult to form hard carbide particles to contribute to antiwear performance. Meanwhile, in response to increase in the content of C, the point of transformation from α to γ drops, hardness and a dilation deformation amount are increased in a part heated by frictional heat during formation of a martensitic structure, and thermal conductivity is reduced. An upper limit of the content of C determined within a range satisfying the formula (1) or (2) in consideration of a balance with other characteristics is 0.12%. Thus, the content of C is determined to be from 0.03% or more and 0.12% or less. If enhancement of heat spot resistance is given higher priority, it is preferable that the content of C be below 0.10%.

Regarding Si (silicon), a content below 0.4% is sufficient if Si is to be added for the general purpose of deoxidization. Meanwhile, Si has the effect of increasing the point of transformation from α to γ so the content of Si may exceed 0.4%. Adding Si excessively to a content exceeding 1.0% is likely to cause brittle fracture during rolling of a steel plate, for example. Thus, the content of Si is determined to be 0% (including a case where Si is not added) or more and 1.0% or less.

Regarding manganese (Mn), Mn is an element necessary for enhancing the strength of a material steel plate and should be added to a content of 0.2% or more for enhancing the strength. Meanwhile, Mn has the effect of reducing the point of transformation from α to γ. Thus, adding Mn to a content exceeding 0.8% reduces the point of transformation from α to γ. Thus, the content of Mn is determined to be from 0.2% or more and 0.8% or less. As the content of Mn increases, a hot-rolled steel plate is more likely to be formed into a structure with bands and the nature of the hot-rolled steel plate at a punching cross section formed by punching process is more likely to be degraded. Thus, it is more preferable that the content of Mn be 0.6% or less.

Regarding P (phosphorous) and S (sulfur), adding P and S to a content exceeding 0.03% reduces punching performance and toughness. Thus, the content of P is determined to be 0.03% or less (excluding a case where P is not added) and that of S is determined to be 0.03% or less (excluding a case where S is not added).

Regarding Ti (titanium), Ti is bonded to C in steel to form a hard carbide, contributing to enhancement of antiwear performance. Further, Ti has the effect of fixing carbon in the steel as TiC of a low degree of solubility and suppressing α to γ transformation in a part heated by frictional heat. Additionally, Ti effectively suppresses coarsening of the diameter of ferrite crystal grains and softening in a part where a temperature is to be increased by friction. Thus, Ti is the most significant element and should be added to a content of 0.04% or more for achieving each of these effects. Meanwhile, adding Ti to a content exceeding 0.3% increases the hardness of a hot-rolled steel plate. This makes it impossible to manufacture steel for a plate of an intended thickness and intended hardness of the plate as a product. Thus, the content of Ti is determined to be 0.04% or more and 0.3% or less.

Regarding Al (aluminum), Al is an element having a deoxidizing effect. A content below 0.01% is sufficient if Al is to be added only for the purpose of deoxidization. Meanwhile, Al has the effect of increasing the point of transformation from $\alpha$ to $\gamma$, so that the content of Al may exceed 0.01%. In the case of steel containing Ti as a principal additive element added to a given concentration, adding Al in large quantities to this steel to a content exceeding 0.05% does not work advantageously in terms of the effect of increasing a transformation point. Thus, the content of Al is determined to be 0.05% or less (excluding a case where Al is not added).

Regarding Cr (chromium), Ni (nickel), Mo (molybdenum), B (boron), Nb (niobium), and V (vanadium), these elements have the effect of enhancing antiwear performance and toughness. Thus, it is preferable that these elements be added if a counterpart spline to make a fit with a spline part of a separator plate is hard as a result of surface hardening treatment such as carburizing or nitriding, for example.

If Cr is to be added, the content of Cr is determined to be 0.10% or more and 2.0% or less in consideration of its effect of enhancing antiwear performance and its side effect.

If Ni is to be added, the content of Ni is determined to be 0.05% or more and 0.5% or less in consideration of its effect of enhancing toughness and its side effect.

If Mo is to be added, the content of Mo is determined to be 0.05% or more and 0.5% or less in consideration of its effect of enhancing toughness and its side effect.

If B is to be added, the content of B is determined to be 0.0002% or more and 0.002% or less in consideration of its effect of enhancing toughness and its side effect.

If Nb is to be added, the content of Nb is determined to be 0.01% or more and 0.2% or less in consideration of its effect of enhancing antiwear performance and its side effect.

If V is to be added, the content of V is determined to be 0.01% or more and 0.2% or less in consideration of its effect of enhancing antiwear performance and its side effect.

The point of transformation from a to T and the quenching performance of a cold-rolled steel plate are affected by the respective effects of C, Si, Mn and Al, and the respective effects of the elements Cr and Ni to be added according to demand. Thus, the respective contents of these elements should be examined comprehensively. To increase the point of transformation from $\alpha$ to $\gamma$ and to reduce the quenching performance, the content of each element should satisfy the relationship defined by the formula (1): 5*C %–Si %+Mn %–1.5*Al %<1 or by the formula (2): 5*C %–Si %+Mn %+1.6*Cr %+0.8*Ni %–1.5*Al %<.

As described above, a Ti-based carbide is a considerably significant element for enhancing heat spot resistance and antiwear performance. Specifically, a Ti-based carbide in a surface of a steel plate exerts its effect for enhancing heat spot resistance and antiwear performance at a surface in friction with a friction plate. For this purpose, the Ti-based carbide should be dispersed finely and uniformly. More specifically, an average diameter of the Ti-based carbide particles as precipitates in the steel plate should be in a range from 20 nm or more and 100 nm or less.

In particular, a Ti-based carbide existing in a surface of the steel plate and a front layer part near the surface largely affects heat spot resistance and antiwear performance. Thus, it is preferable that an average diameter of particles of a Ti-based carbide existing at least in the front layer part extending from the surface of the steel plate to a depth of 200 µm be 20 nm or more and 100 nm or less.

Meanwhile, a Ti-based carbide existing in a position such as a central part of the cross-sectional direction of the steel plate deeper than the front layer part does not contribute much to heat spot resistance. If given excellent antiwear performance, this Ti-based carbide in turn causes the risk of damage to a counterpart material. Thus, an average diameter of particles of the Ti-based carbide existing in the central part of the cross-sectional direction of the steel plate is only required to be substantially the same as that of the particles in the front layer part. A Ti-based carbide in the central part of the cross-sectional direction existing in excessively larger quantities than that in the front layer part in turn is not preferable in terms of using a cold-rolled steel plate as a clutch plate. Thus, like that of a Ti-based carbide in the front layer part, it is preferable that an average diameter of particles of a Ti-based carbide in the central part of the cross-sectional direction of the steel plate or that of particles of a Ti-based carbide in a layer near the center of the cross-sectional direction and deeper than the depth of 200 µm from the surface of the steel plate be 20 nm or more and 100 nm or less.

A manufacturing method of this invention is described next.

First, a steel slab is smelted that has a chemical composition containing C from 0.03 to 0.12%, Si from 0 to 1.0% (including a case where Si is not added), Mn from 0.2 to 0.8%, P at 0.03% or less (excluding a case where P is not added), S at 0.03% or less (excluding a case where S is not added), Ti from 0.04 to 0.3%, and Al at 0.05% or less (excluding a case where Al is not added), with a residue being formed of Fe and unavoidable impurities. The chemical composition satisfies the relationship defined by the formula (1).

This steel slab is heated to 1200° C. or more and then hot rolled. A heating temperature below 1200° C. leads to the probability of failing to dissolve a Ti-based carbide sufficiently.

For the hot rolling, it is preferable that a hot rolling finishing temperature be set to a temperature higher than an Ar$_3$ transformation point in terms of the quality of a hot-rolled steel plate and hot rolling efficiency, for example. Specifically, the finishing temperature is determined to be 850° C. or more and 950° C. or less and a hot-rolled coil formed by winding the hot-rolled steel plate at a winding temperature in a temperature range from 500° C. or more and 700° C. or less is used as a material. A winding temperature below 500° C. does not produce a precipitate of a Ti-based carbide in large quantities. Meanwhile, a winding temperature exceeding 700° C. decarburizes a surface of the steel plate notably. This reduces the quantity of the precipitate of the Ti-based carbide in the outermost layer part and reduces the diameter of particles of the Ti-based carbide. Additionally, moderate cooling to reduce a temperature from the finishing temperature to the winding temperature at an average cooling rate below 20° C. per second coarsens the Ti-based carbide. Thus, it is preferable that the average cooling rate be 20° C. per second or more.

The hot-rolled steel plate is subjected to acid pickling to remove scales from a surface and is then cold rolled to become a product. More specifically, to obtain hardness of 200 HV or more and 400 HV or less required for the steel plate as a clutch plate, specifically as a separator plate, the steel plate should be cold rolled at a cold rolling ratio of 20% or more and 70% or less. The hardness is controlled by controlling the rolling ratio.

A friction plate is required to have hardness of 200 HV or more and 400 HV or less and flatness in terms of punching performance. Thus, the friction plate is manufactured as a product by cold rolling the hot-rolled steel plate. To ensure flatness, it is preferable that the cold rolling ratio be controlled in a range of 20% or more and 70% or less. Hardness below 200 HV causes a serious sagging and a serious burr of a punched item and causes a secondary shear surface, degrading the nature of a spline part. Meanwhile, hardness exceeding 400 HV causes serious wear or damage to a punch die while failing to form a shear surface in a punching surface. This makes it impossible to form a preferable shape for a spline part.

If the occasion arises, annealing may be performed directly on the hot-rolled steel plate or may be performed as intermediate annealing on the cold-rolled steel plate. In either case, it is preferable that the steel plate be cold rolled after the annealing. If the intermediate annealing is to be performed during the cold rolling process, a suitable annealing condition can be selected appropriately in view of the thickness of a product and the cold rolling ratio. An annealing condition to cause surface decarburization is not preferable.

Regarding the aforementioned cold-rolled steel plate, the chemical composition is controlled based on the aforementioned first to fourth countermeasures and an average diameter of particles of a Ti-based carbide is determined to be 20 nm or more and 100 nm or less, thereby enhancing heat spot resistance and antiwear performance.

According to the conventional techniques, an alloy element added content should be reduced to enhance heat spot resistance while an alloy element required for enhancing antiwear performance should be added to enhance strength. Thus, enhancement of heat spot resistance and that of antiwear performance cannot be well balanced. On the other hand, the aforementioned cold-rolled steel plate can enhance heat spot resistance and antiwear performance in a well-balanced manner. Thus, the aforementioned cold-rolled steel plate is used appropriately as a material for a clutch plate, for example.

EXAMPLES

Working Examples and Comparative Examples are described below.

Steel slabs having chemical compositions shown in Table 1 were smelted. Referring to Table 1, if at least one of Cr, Ni, Mo, B, Nb, and V was not added, a value of the left side of the formula (1) is shown as a Q value. If at least one of Cr, Ni, Mo. B, Nb, and V was added, a value of the left side of the formula (2) is shown as the Q value.

TABLE 1

(Percent by mass)

| Steel | | C | Si | Mn | P | S | Cr | Ti | Nb | Ni | V | Mo | B | Al | Q value |
|---|---|---|---|---|---|---|---|---|---|---|---|---|---|---|---|
| Comparative Examples | 1 | 0.07 | 0.28 | 0.54 | 0.012 | 0.006 | — | 0.01 | — | — | — | — | — | 0.010 | 0.60 |
| | 2 | 0.22 | 0.22 | 0.48 | 0.016 | 0.003 | — | 0.17 | 0.05 | — | — | — | — | 0.007 | 1.35 |
| | 3 | 0.12 | 0.07 | 0.67 | 0.015 | 0.005 | — | 0.17 | — | — | — | — | — | 0.012 | 1.18 |
| | 4 | 0.06 | 0.10 | 0.65 | 0.013 | 0.003 | — | — | 0.19 | — | — | — | — | 0.010 | 0.84 |
| | 5 | 0.10 | 1.23 | 0.44 | 0.014 | 0.004 | — | 0.10 | — | — | — | 0.08 | — | 0.015 | −0.31 |
| | 6 | 0.02 | 0.04 | 0.41 | 0.009 | 0.005 | — | 0.11 | — | — | — | — | — | 0.009 | 0.46 |
| | 7 | 0.07 | 0.06 | 0.32 | 0.015 | 0.005 | — | 0.47 | — | — | — | — | — | 0.011 | 0.59 |
| | 8 | 0.11 | 0.06 | 0.37 | 0.016 | 0.007 | — | 0.16 | 0.35 | — | — | — | — | 0.011 | 0.84 |
| | 9 | 0.08 | 0.05 | 1.30 | 0.011 | 0.004 | — | 0.06 | 0.01 | — | — | — | — | 0.190 | 1.37 |
| | 10 | 0.15 | 0.05 | 1.32 | 0.016 | 0.004 | — | 0.22 | — | — | — | — | — | 0.041 | 1.96 |
| Working Examples | 11 | 0.07 | 0.11 | 0.41 | 0.011 | 0.004 | — | 0.07 | — | — | — | — | — | 0.006 | 0.64 |
| | 12 | 0.11 | 0.07 | 0.38 | 0.009 | 0.003 | — | 0.14 | — | — | — | — | — | 0.011 | 0.84 |
| | 13 | 0.07 | 0.03 | 0.38 | 0.014 | 0.006 | — | 0.10 | 0.07 | — | — | — | — | 0.009 | 0.69 |
| | 14 | 0.05 | 0.05 | 0.35 | 0.008 | 0.004 | 0.11 | 0.25 | 0.06 | — | — | — | — | 0.007 | 0.72 |
| | 15 | 0.06 | 0.07 | 0.40 | 0.012 | 0.003 | — | 0.09 | — | — | — | — | — | 0.010 | 0.62 |
| | 16 | 0.05 | 0.12 | 0.50 | 0.009 | 0.004 | — | 0.10 | — | — | — | — | 0.001 | 0.010 | 0.62 |
| | 17 | 0.06 | 0.05 | 0.36 | 0.012 | 0.003 | — | 0.08 | — | 0.10 | — | — | — | 0.011 | 0.59 |
| | 18 | 0.05 | 0.07 | 0.39 | 0.009 | 0.005 | — | 0.10 | — | — | — | 0.13 | — | 0.009 | 0.56 |
| | 19 | 0.05 | 0.11 | 0.41 | 0.010 | 0.005 | — | 0.09 | — | — | 0.11 | — | — | 0.008 | 0.54 |
| | 20 | 0.11 | 0.15 | 0.55 | 0.013 | 0.005 | — | 0.07 | — | — | — | — | — | 0.013 | 0.93 |
| | 21 | 0.07 | 0.78 | 0.72 | 0.014 | 0.004 | — | 0.16 | — | — | — | — | — | 0.020 | 0.26 |
| | 22 | 0.07 | 0.15 | 0.44 | 0.011 | 0.003 | — | 0.07 | — | 0.43 | — | — | — | 0.020 | 0.95 |
| | 23 | 0.04 | 0.05 | 0.40 | 0.012 | 0.005 | — | 0.08 | — | — | — | — | — | 0.018 | 0.52 |
| | 24 | 0.03 | 0.04 | 0.31 | 0.009 | 0.004 | — | 0.05 | — | — | — | — | 0.002 | 0.015 | 0.40 |
| | 25 | 0.04 | 0.07 | 0.52 | 0.013 | 0.006 | — | 0.06 | — | — | — | 0.05 | — | 0.013 | 0.63 |

Using various types of steel slabs, hot rolling and cold rolling were performed under conditions shown in Table 2 to produce various types of samples.

The hot rolling was performed at a heating temperature of 1100° C. or 1250° C. A winding temperature was set at any of 450° C., 570° C., 600° C., and 700° C.

After being pickled with hydrochloric acid, the hot-rolled steel plates were finished to a thickness of 1.8 mm at various cold rolling ratios. Target cross-sectional hardness at a time after the cold rolling was 250 HV. According to one of the Working Examples, a hot-rolled steel plate was annealed at 690° C. and then cold rolled.

Each of these samples was subjected to measurement of heat conductivity, measurement of cross-sectional hardness, and measurement of an average diameter of particles of a Ti-based carbide (TiC).

Further, a test piece was extracted from each sample and was subjected to a punching test, a pin-on-disk friction and wear test, and a heat spot resistance test.

For the measurement of heat conductivity, heat conductivity was measured in a range from 100 to 200° C. using a laser flash method. A test piece with measured heat conductivity of 50 W/m·K or more was evaluated as being good and is identified with o in Table 2.

For the measurement of cross-sectional hardness, a part of each sample was cut out, buried in resin, and polished. Then, Vickers hardness was measured at a central part of the thickness of a cross section. A measuring load was 5 kgf.

For the measurement of an average diameter of particles of TiC in a front layer, a part of each sample was cut and buried in resin so as to obtain an observation surface parallel to a rolling direction of a cold-rolled steel plate. Then, this part was etched to produce an extraction replica and a precipitate was observed. A transmission electron microscope (TEM) was used for the observation. The size of the precipitate was determined in terms of a circle with an image analyzer and the diameter of each precipitate was calculated. An imaging magnification ratio was 50,000 and ten fields of view were observed. A sum of the calculated particle diameters of the precipitates was divided by the number of the precipitates to obtain an average particle diameter. Regarding the average particle diameter of the precipitates of each sample measured in this way, an average particle diameter below 20 nm was evaluated as A, an average particle diameter from 20 to 100 nm was evaluated as B, and an average particle diameter exceeding 100 nm was evaluated as C, as shown in Table 2.

For the punching test, a circular hole of a thickness of 1.8 mm and a diameter of 10 mm was punched out of each test piece using a 300 kN universal tester. For a punch die, SKD11 conforming to the JIS standards mainly for cold work dies having a punch and a dice both controlled at 60 HRC was used. The test was conducted under conditions of a punching speed of 1.7 mm/s and a clearance of 5%. A punched item with 20 to 30 punching shots was collected and was evaluated in terms of the amount of sagging at a shear surface and a shear rate. More specifically, each index was measured and an average was calculated in a direction in which a material steel plate was rolled and in a direction at a right angle to the rolling direction. Thresholds for determining pass or failure were 0.2 mm for the sagging amount and 70% for the shear rate. A test piece with indexes satisfying all the thresholds was evaluated as being good and is identified with o in Table 2.

For the pin-on-disk friction and wear test, the wear test was conducted using a pin-on-disk friction and wear tester while mission oil was dropped. More specifically, a pin having a rectangular plate shape of 10 mm by 2 mm of a thickness of 1.8 mm was fixed to a sample holder so as to form a surface to contact a disk into a thickness of 1.8 mm by 2 mm. Non-woven cloth (buff) was affixed to the disk. With application of paste containing aluminum oxide of a particle diameter of 0.1 μm, the wear test was conducted under conditions of a friction speed of 1.0 m/s and a friction distance of 3600 m while the pin was pressed under a test load of 50 N. A friction surface of the pin before conduction of the friction test was controlled at roughness Ra=0.2 μm. A test piece resulting in roughness Ra=0.1 μm or more of the friction surface of the pin after conduction of the friction test was evaluated as being good and is identified with o in Table 2.

The heat spot resistance test (rapid heating and rapid cooling test) was conducted through a method of heating a front layer part locally by applying powerful laser light for a short period of time to a surface of a test piece. Specifically, after the surface of the steel plate was heated with the laser light, the laser irradiation was stopped. Then, the self-cooling effect of the steel plate rapidly cooled the heated part to produce a characteristic altered layer (layer containing martensite subjected to structure change) in a heat spot. Even in the absence of the martensitic phase, temperature increase resulting from the laser irradiation may cause recrystallization of a material steel plate hardened by cold rolling to form coarse crystal grains, thereby reducing hardness in some cases. If the altered layer is formed in this way resulting from either hardening or softening, a difference is generated between cross-sectional hardness inside the material steel plate and hardness at the laser-irradiated part. This allows evaluation of heat spot resistance by means of measurement of cross-sectional hardness at a front layer part and internal cross-sectional hardness.

Figure 1:
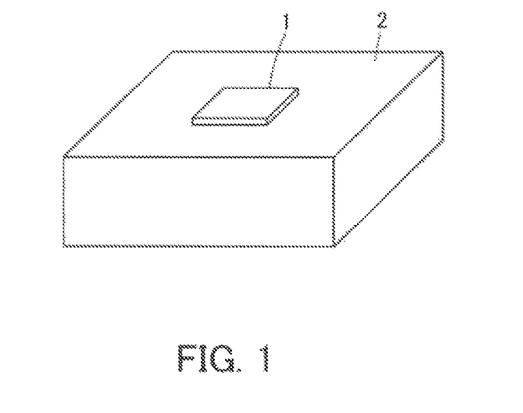
FIG. 1 is a perspective view showing a state before a test to examine heat spot resistance of a Working Example of this invention is conducted.

The following describes in detail how this heat spot resistance test was conducted. As shown in FIG. 1, a test piece 1 of 25 mm by 25 mm extracted from each sample was fixed with a bolt not shown in the drawings to a central part of a surface of a steel block 2 of 60 mm by 60 mm and a thickness of 20 mm. Then, a laser beam was applied to a central part of a surface of the test piece 1. Regarding conditions for the irradiation, a $CO_2$ laser was applied with an effective output of 1080 W, a beam shape was 6 mm in diameter, and an irradiation time was 0.75 seconds.

Figure 2A:
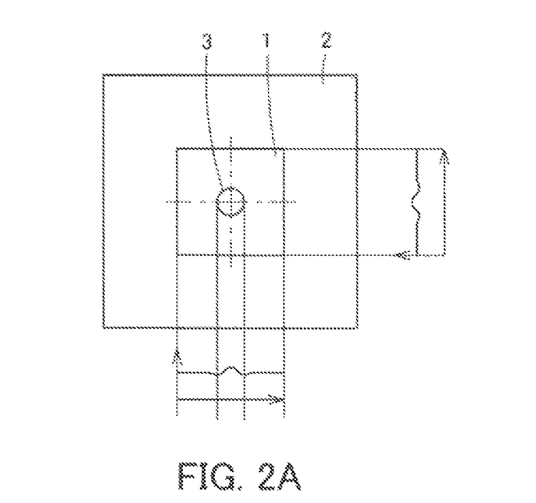
FIG. 2A is a plan view showing a state after the test to examine the heat spot resistance of the Working Example is conducted.
Figure 2B:
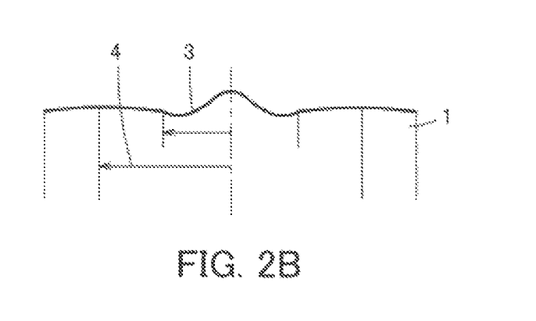
FIG. 2B is a sectional view showing a state after the test to examine the heat spot resistance of the Working Example is conducted.

As shown in FIGS. 2A and 2B, in the cross section of the test piece 1 after the laser irradiation, Vickers hardness was measured at a front layer extending from a surface of a laser-irradiated part 3 irradiated with the laser to a position of 100 μm and at a thickness central part 4 corresponding to a central part of a thickness direction. Then, a degree of hardening or softening of the front layer relative to the internal hardness was evaluated. In Table 2, a test piece 1 generating a difference of ±50 HV or less between the hardness at the front layer and the internal hardness was evaluated as being good and is identified with o, a test piece 1 generating the difference exceeding 50 HV but below 100 HV is identified with Δ, a test piece 1 generating the difference of 100 HV or more is identified with ΔΔ, and a test piece 1 generating the difference below −50 HV or less is identified with ♥.

The test pieces were evaluated comprehensively. A test piece evaluated as being good in all the following three evaluations was determined to having passed the tests and is identified with o in Table 2: evaluation of the nature of a punching surface through the punching test, evaluation of antifriction and antiwear performance through the pin-on-disk friction and wear test, and evaluation of heat spot resistance through the heat spot resistance test.

Respective conditions for the tests and test results are shown in Table 2.

TABLE 2

| Test No. | | Heat rolling condition | Average Cooling rate | Annealing | Cold rolling | Plate thickness (mm) | Hardness at cross section (HV) |
|---|---|---|---|---|---|---|---|
| 1 | Comparative Example | 1250° C. heating to 570° C. winding | 33° C./sec. | No | Yes | 1.8 | 254 |
| 2 | Comparative Example | 1250° C. heating to 570° C. winding | 31° C./sec. | No | Yes | 1.8 | 265 |
| 3 | Comparative Example | 1250° C. heating to 570° C. winding | 28° C./sec. | No | Yes | 1.8 | 256 |

TABLE 2-continued

| | | | | | | | |
|---|---|---|---|---|---|---|---|
| 4 | Comparative Example | 1250° C. heating to 570° C. winding | 25° C./sec. | No | Yes | 1.8 | 250 |
| 5 | Comparative Example | 1250° C. heating to 570° C. winding | 28° C./sec. | No | Yes | 1.8 | 363 |
| 6 | Comparative Example | 1250° C. heating to 570° C. winding | 30° C./sec. | No | Yes | 1.8 | 258 |
| 7 | Comparative Example | 1250° C. heating to 570° C. winding | 29° C./sec. | No | Yes | 1.8 | 377 |
| 8 | Comparative Example | 1250° C. heating to 570° C. winding | 32° C./sec. | No | Yes | 1.8 | 347 |
| 9 | Comparative Example | 1250° C. heating to 600° C. winding | 33° C./sec. | No | Yes | 1.8 | 246 |
| 10 | Comparative Example | 1250° C. heating to 600° C. winding | 30° C./sec. | No | Yes | 1.8 | 254 |
| 11-a | Working Example | 1250° C. heating to 570° C. winding | 31° C./sec. | No | Yes | 1.8 | 262 |
| 11-b | Working Example | 1250° C. heating to 570° C. winding | 33° C./sec. | No | Yes | 1.8 | 179 |
| 11-c | Comparative Example | 1250° C. heating to 720° C. winding | 30° C./sec. | No | Yes | 1.8 | 256 |
| 11-d | Comparative Example | 1250° C. heating to 570° C. winding | 32° C./sec. | No | Yes | 1.8 | 262 |
| 12-a | Working Example | 1250° C. heating to 570° C. winding | 28° C./sec. | No | Yes | 1.8 | 262 |
| 12-b | Working Example | 1250° C. heating to 570° C. winding | 25° C./sec. | 690° C.-20 h | Yes | 1.8 | 266 |
| 12-c | Comparative Example | 1250° C. heating to 450° C. winding | 11° C./sec. | No | No | 1.8 | 431 |
| 13 | Working Example | 1250° C. heating to 570° C. winding | 27° C./sec. | No | Yes | 1.8 | 252 |
| 14 | Working Example | 1250° C. heating to 570° C. winding | 30° C./sec. | No | Yes | 1.8 | 261 |
| 15 | Working Example | 1250° C. heating to 570° C. winding | 32° C./sec. | No | Yes | 1.8 | 256 |
| 16 | Working Example | 1250° C. heating to 570° C. winding | 29° C./sec. | No | Yes | 1.8 | 248 |
| 17 | Working Example | 1250° C. heating to 570° C. winding | 32° C./sec. | No | Yes | 1.8 | 257 |
| 18 | Working Example | 1250° C. heating to 570° C. winding | 27° C./sec. | No | Yes | 1.8 | 255 |
| 19 | Working Example | 1250° C. heating to 650° C. winding | 26° C./sec. | No | Yes | 1.8 | 260 |
| 20 | Working Example | 1250° C. heating to 600° C. winding | 25° C./sec. | No | Yes | 1.8 | 247 |
| 21 | Working Example | 1250° C. heating to 600° C. winding | 28° C./sec. | No | Yes | 1.8 | 266 |
| 22 | Working Example | 1250° C. heating to 600° C. winding | 33° C./sec. | No | Yes | 1.8 | 263 |
| 23 | Working Example | 1250° C. heating to 600° C. winding | 31° C./sec. | No | Yes | 1.8 | 251 |
| 24 | Working Example | 1250° C. heating to 600° C. winding | 28° C./sec. | No | Yes | 1.8 | 258 |
| 25 | Working Example | 1250° C. heating to 600° C. winding | 32° C./sec. | No | Yes | 1.8 | 246 |

| Test No. | TiC Average particle diameter in front layer part | Heat conductivity | Punching test | Friction test | Rapid heating/ Rapid cooling test | Comprehensive evaluation | SAE-No. 2 test |
|---|---|---|---|---|---|---|---|
| 1 | A | ○ | ○ | ○ | X | ▼ | X | |
| 2 | B | X | ○ | ○ | ΔΔ | X | |
| 3 | B | ○ | ○ | ○ | Δ | X | |
| 4 | — | ○ | ○ | ○ | ▼ | X | |
| 5 | B | ○ | X | ○ | ○ | X | |
| 6 | B | ○ | ○ | X | ▼ | X | |
| 7 | C | ○ | X | ○ | ○ | X | |
| 8 | B | ○ | X | ○ | ○ | X | |
| 9 | B | ○ | X | ○ | Δ | X | X |
| 10 | B | X | X | ○ | ΔΔ | X | X |
| 11-a | B | ○ | ○ | ○ | ○ | ○ | ○ |
| 11-b | B | ○ | X | X | ○ | X | |
| 11-c | A | ○ | ○ | X | ▼ | X | |
| 11-d | A | ○ | ○ | X | ▼ | X | |
| 12-a | B | ○ | ○ | ○ | ○ | ○ | ◎ |
| 12-b | B | ○ | ○ | ○ | ○ | ○ | ◎ |
| 12-c | C | ○ | X | ○ | ▼ | X | X |
| 13 | B | ○ | ○ | ○ | ○ | ○ | ◎ |
| 14 | B | ○ | ○ | ○ | ○ | ○ | |
| 15 | B | ○ | ○ | ○ | ○ | ○ | |
| 16 | B | ○ | ○ | ○ | ○ | ○ | |
| 17 | B | ○ | ○ | ○ | ○ | ○ | |
| 18 | B | ○ | ○ | ○ | ○ | ○ | |
| 19 | B | ○ | ○ | ○ | ○ | ○ | |
| 20 | B | ○ | ○ | ○ | ○ | ○ | ○ |
| 21 | B | ○ | ○ | ○ | ○ | ○ | |
| 22 | B | ○ | ○ | ○ | ○ | ○ | |
| 23 | B | ○ | ○ | ○ | ○ | ○ | |
| 24 | B | ○ | ○ | ○ | ○ | ○ | |
| 25 | B | ○ | ○ | ○ | ○ | ○ | |

As shown in Table 2, all Working Examples achieved favorable results in terms of punching performance, antifriction and antiwear performance, and heat spot resistance.

Regarding each of test Nos. 11-a, 12-a, 12-b, 13, and 20 corresponding to Working Examples and test Nos. 9, 10, and 12-c corresponding to Comparative Examples, a test piece was actually formed into the shape of a separator plate and was subjected to a clutch performance test with an SAE-No. 2 tester as a compact clutch friction tester. Then, the presence or absence of a heat spot was observed visually.

As a result, the occurrence of a heat spot was not observed in any of Working Examples. In contrast, the occurrence of a heat spot was observed in all Comparative Examples.

The invention claimed is:
1. A cold-rolled steel plate having enhanced heat spot resistance and antiwear performance with a chemical composition containing, on the basis of percent by mass, C from 0.03 to 0.12%, Si from 0 to 1.0%, Mn from 0.2 to 0.8%, P at 0.03% or less, S at 0.03% or less, Ti from 0.04 to 0.3%, and Al at 0.05% or less, with a residue being formed of Fe and unavoidable impurities, the chemical composition satisfying 5*C %–Si % +Mn %–1.5*Al %<1, wherein
an average diameter of particles of a Ti-based carbide as a precipitate is from 20 to 100 nm, and
the cold-rolled steel plate has cross-sectional hardness from 200 to 400 HV.

2. The cold-rolled steel plate according to claim 1, wherein the chemical composition contains, on the basis of percent by mass, at least one of Cr from 0.10 to 2.0%, Ni from 0.05 to 0.5%, Mo from 0.05 to 0.5%, B from 0.0002 to 0.002%, Nb from 0.01 to 0.2%, and V from 0.01 to 0.2%, the chemical composition satisfying 5*C %−Si %+Mn %+1.6*Cr %+0.8*Ni %−1.5*Al %<1.

3. The cold-rolled steel plate according to claim 1, wherein the average diameter of particles of the Ti-based carbide is from 20 to 100 nm in a front layer part extending at least 200 μm from a surface of the steel plate.

4. The cold-rolled steel plate according to claim 2, wherein the average diameter of particles of the Ti-based carbide is from 20 to 100 nm in a front layer part extending at least 200 μm from a surface of the steel plate.

5. The cold-rolled steel plate according to claim 1, wherein the chemical composition consists of Mn from 0.2 to 0.6%.

6. The cold-rolled steel plate according to claim 1, wherein the cold-rolled steel plate is a clutch plate.

\* \* \* \* \*